Oct. 21, 1952          A. R. LAY          2,614,345
SCRAPER ATTACHMENT FOR TRACTORS
Filed June 30, 1950          2 SHEETS—SHEET 1
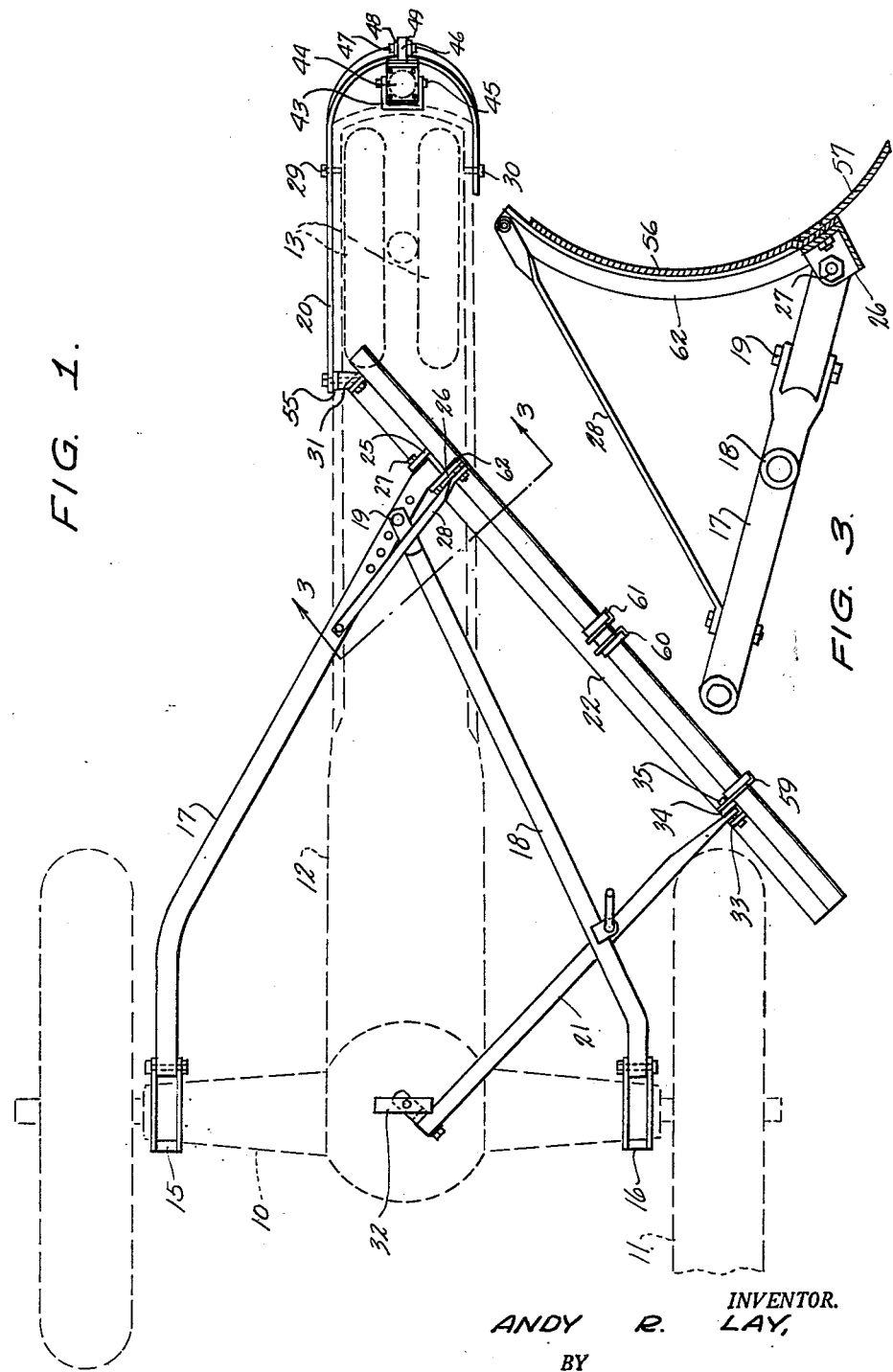
INVENTOR.
ANDY R. LAY,
BY
McMorrow, Berman + Davidson
ATTORNEYS.

Oct. 21, 1952        A. R. LAY        2,614,345
SCRAPER ATTACHMENT FOR TRACTORS
Filed June 30, 1950        2 SHEETS—SHEET 2
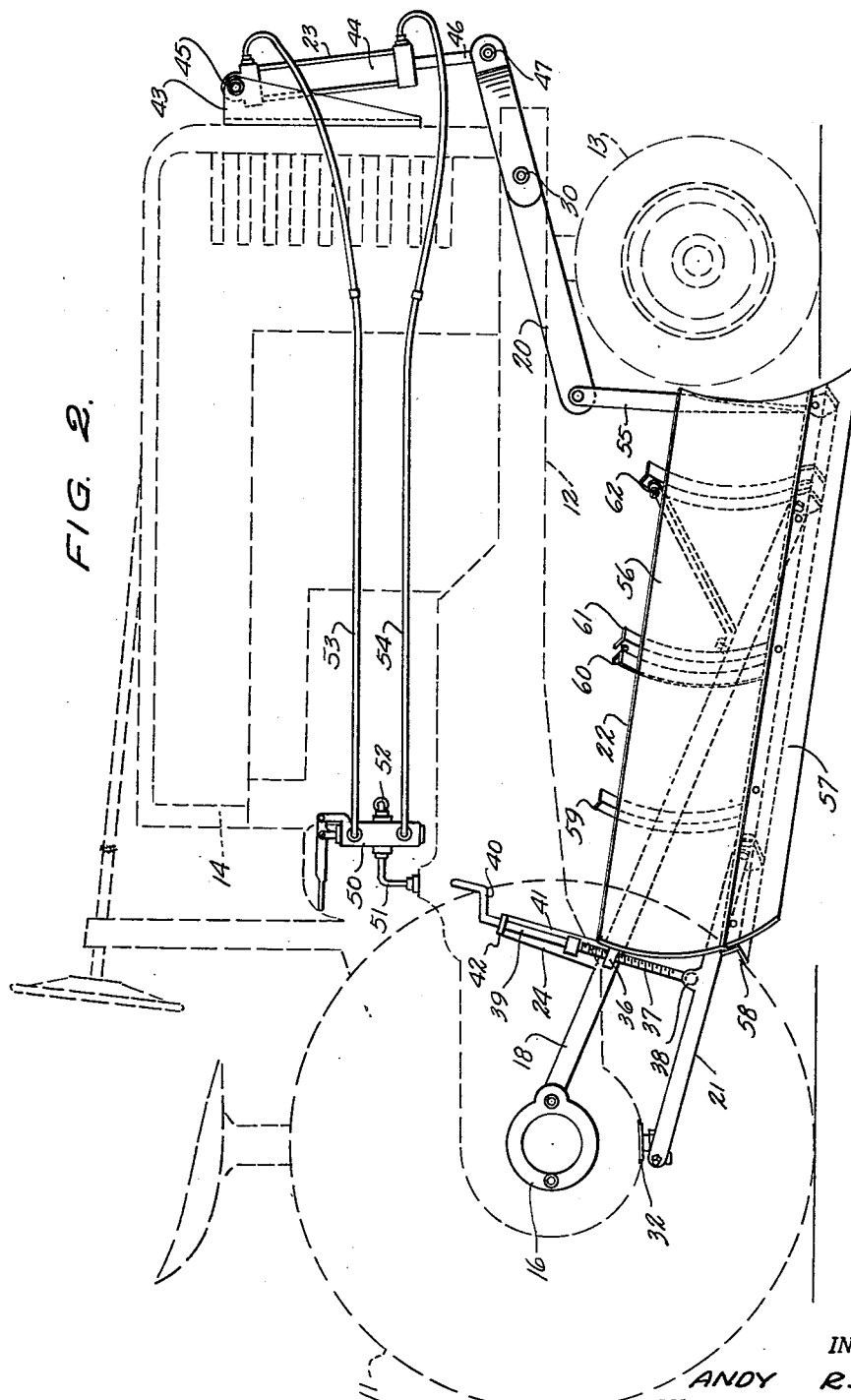
INVENTOR.
ANDY R. LAY,
BY McMorrow, Berman + Davidson
ATTORNEYS.

Patented Oct. 21, 1952

2,614,345

UNITED STATES PATENT OFFICE 2,614,345

SCRAPER ATTACHMENT FOR TRACTORS

Andy R. Lay, Council, Idaho

Application June 30, 1950, Serial No. 171,396

3 Claims. (Cl. 37—155)

This invention relates to attachments for agricultural tractors and more particularly to a grading or ditching blade attachment for such a tractor.

It is among the objects of the invention to provide an improved grading or ditching blade attachment for an agricultural tractor which mounts the blade between the front and rear wheels of the tractor to extend transversely of the tractor frame at an inclination to the longitudinal center line of the tractor, which provides power operated mechanism for raising and lowering the blade and manually operated means for adjusting the operating depth of the blade, which is operative to vary the inclination of the blade relative to the ground, which provides a highly simplified arrangement for mounting the blade on the tractor, which can be mounted on an existing tractor with no material modification of the tractor construction, and which is simple and durable in construction, economical to manufacture, and positive in operation.

Other objects and advantages will become apparent from a consideration of the following description and the appended claims in conjunction with the accompanying drawings wherein:

Figure 1 is a top plan view of a ditching blade attachment illustrative of the invention with an agricultural tractor shown in outline;

Figure 2 is a side elevational view of the tractor and ditching blade attachment illustrated in Figure 1; and Figure 3 is a cross sectional view on the line 3—3 of Figure 1.

With continued reference to the drawings, the tractor illustrated has a rear axle 10 supported on rear wheels 11 mounted on the axle at respectively opposite ends thereof, a frame 12 mounted at one end on the rear axle and supported at its other end on front wheels 13, and engine 14 mounted on the frame and the usual appurtenances.

The attachment assembly of the present invention comprises two brackets 15 and 16 mounted on the tractor rear axle 10 near respectively opposite ends of the latter and embracingly engaging the rear axle housing, two tubular struts 17 and 18 pivotally connected each at one end to the brackets 15 and 16 respectively and connected together at their other ends intermediate the length of the tractor frame by a pin or bolt 19, a lever 20 pivotally mounted on the front end of the tractor frame, a brace 21 extending from the rear axle across the strut 18, a blade 22 carried by the lever, the struts and the brace, a hydraulic mechanism 23 connected between the lever and the tractor frame and a screw mechanism 24 connected between the strut 18 and the brace 21.

The struts 17 and 18 are bent near their ends connected to the brackets 15 and 16 and converge forwardly from the rear axle, the pin 19 being located substantially in alignment with the longitudinal center line of the tractor frame and extending through a selected one of a series of closely spaced holes in the strut 17. The strut 18 is provided at its end connected to the strut 17 with a bifurcated portion constituting a fork or yoke which receives the strut 17 and the strut 17 and the legs of this yoke are provided with registering apertures through which the pin 19 extends. The strut 17 extends beyond the connection with the strut 18 and is provided at its forward end with an aperture, the center line of which is substantially perpendicular to the center line or axis of the bolt 19 and is substantially horizontally disposed when the attachment is in operative position on a tractor.

Two apertured lugs 25 and 26 are mounted on the back of the blade 22 near one end of the blade and receive the adjacent end of the strut 17 therebetween, and a pivot pin or bolt 27 extends through the registering apertures in the lugs and the adjacent end of the strut 17 to pivotally connect the blade to this strut. A diagonal brace 28 is secured at one end to the upper edge of the blade and near the lugs 25 and 26 and is secured at its opposite end to the strut 17 at the side of the pin 19 remote from the blade to maintain the blade at a predetermined tilt or rake relative to the struts 17 and 18. The adjustable connection between the struts 17 and 18 permits shifting the blade longitudinally so that the end of the blade adjacent the struts will properly follow the front wheels of the tractor.

The lever 20 is an elongated, U shaped member pivotally connected to the frame near the front end of the latter by the pivot bolts 29 and 30 having a common axis extending transversely of the frame and one leg of this U shaped member is elongated and extends from the pivot bolt 29 toward the rear axle 10, this leg being pivotally connected to the adjacent end of the blade by a pivotal connection 31.

The brace 21 is connected at one end to the rear axle 10 substantially at the mid-length location of the axle by a bracket 32 secured to the differential housing of the axle. At its other end this brace is received between two apertured lugs 33 and 34 secured to the blade 22 and projecting from the rearward side of the blade.

The brace has, in this other end, an aperture registering with the apertures in the lugs 33 and 34 and a pivot bolt 35 extends through the registering apertures to pivotally connect the brace to the blade. As stated above, the brace 21 crosses the strut 18 and the screw mechanism 24 is connected between the brace and the strut at the cross-over location.

A screw threaded eye or nut 36 is pivotally connected to the strut 18 and a screw shaft 37 is threaded through the nut 36 and connected to the brace 21 by a ball and socket joint 38. A shank 39 is connected at one end to the end of the screw shaft 37 remote from the ball and socket joint 38 and this shank has on its other end a hand crank 40. A standard 41 projects from the strut 18 in a direction away from the brace 21 and carries at its end remote from the strut an angularly disposed apertured formation 42 which rotatably receives the shank 39 and supports the shank in a position in which its axis of rotation is substantially coincident with the axis of rotation of the screw shaft 37.

With this arrangement, the end of the blade to which the brace 21 is connected, which is the trailing end of the blade, can be raised or lowered relative to the end of the blade to which the struts 17 and 18 are connected for adjustably varying the inclination of the blade relative to the ground.

A bracket 43 is mounted on the tractor above the front end of the tractor frame 12 and a hydraulic cylinder 44 is pivotally connected at one end to the bracket 43 by a pivot pin 45 and depends from the pivot pin. A piston rod 46 projects from the other end of the hydraulic cylinder and is pivotally connected to the lever 20 in front of the front end of the tractor frame by a pivot bolt 47 which projects through registering apertures in the corresponding end of the piston rod and in a pair of spaced apart lugs 48 and 49 which project outwardly from the lever.

A manually operated valve 50 is mounted on the tractor in convenient reach of the tractor operator and is connected at one side by a conduit 51 with the outlet of a tractor operated pump, not illustrated, and at its other side by a conduit 52 with the pump inlet or sump.

The conduits 53 and 54 connect the valve with the respectively opposite ends of the hydraulic cylinder 44 and the valve is manually operable to connect either end of the cylinder with the pump outlet and the other end with the drain or sump to force the piston rod 46 either inwardly or outwardly of the cylinder.

As is clearly apparent from an inspection of Figure 2, when the piston rod is forced outwardly of the cylinder the lever 20 is pivoted on the pivot bolts 29 and 30 to raise the end of the blade 22 to which the lever is connected and when the piston rod is forced inwardly of the cylinder the lever 20 is moved to force the corresponding end of the blade downwardly and into the ground. The range of movement of the leading edge of the blade to which the lever 20 is connected by the link 55 and pivotal connection 31 may be controlled by the length of the hydraulic cylinder 34 or, if desired, suitable adjustable stop means may be provided to limit movements of the lever in both directions.

The blade assembly 22 comprises a plate 56 of elongated, rectangular shape transversely curved substantially to a partly cylindrical shape, an elongated blade 57 detachably secured along one edge to the plate 56 along one edge of the latter in position to engage the ground when the blade is mounted in operative position on a tractor, a reinforcing angle iron 58 extending along the edge of the plate 56 to which the blade 57 is attached at the convex side of the plate and longitudinally curved angle iron battens 59, 60, 61 and 62 secured to the convex side of the plate and extending transversely of the plate at spaced apart locations therealong.

This attachment is particularly useful for ditching agricultural land although it may be used for grading and similar purposes. When the tractor mounted attachment is used for ditching, one passage of the tractor across a field will provide a ditch having one inclined and raised side and a straight side opposite the inclined side. If it is desired to have a ditch with two inclined and raised sides, the tractor is simply driven in opposite directions along the same ditch. The attachment may be used for refilling the ditch, when desired, and may be easily removed from the tractor when it is desired to use the tractor for other purposes.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a tractor having a rear axle, a frame secured at one end to said rear axle, and front wheels supporting the other end of said frame, struts secured each at one end to said rear axle near respectively opposite ends of the latter and connected together at their other ends intermediate the length of said frame, a lever pivotally connected intermediate its length to said frame near said other end of the latter and extending toward said rear axle, a blade pivotally connected at one end to the end of said lever proximate to said rear axle and disposed transversely of said frame and inclined to the longitudinal center line of the latter, means pivotally connecting said blade at a location spaced from said one end of the blade to one of said struts at the end of the latter remote from said rear axle, a brace connected at one end to said rear axle intermediate the length of the latter and connected at its other end to said blade near the other end of the blade, said brace crossing the other of said struts, screw mechanism connected between said brace and said other strut for adjustably raising and lowering said other end of the blade, and manually controlled power operated means connected between said frame and said lever for bodily raising and lowering said blade.

2. A tractor attachment comprising an elongated blade assembly transversely curved to provide a concave side and a convex side, a first elongated strut pivotally connected at one end to said blade near one end and at the convex side of the latter, a bracket pivotally connected to the other end of said first strut for connecting said first strut to a tractor rear axle, a second strut connected at one end to said first strut adjacent said blade assembly and diverging from said first strut in a direction away from said blade assembly, a bracket pivotally secured to the other end of said second strut for connecting the latter to a tractor rear axle, a brace pivotally secured at one end to said blade assembly near the other end of the latter and crossing said second strut, a bracket pivotally secured to the other end of said brace for connecting the latter to a tractor rear axle, a screw mechanism connected between said brace and said second strut at the location at which said brace crosses said strut, a lever pivotally connected at one end to said blade at said one end of the latter, means engaging said lever intermediate the length of the latter for pivotally mounting said lever on a tractor, and means connected to the other end of said lever and connectible to a tractor for moving said lever about said means for pivotally connecting said lever to a tractor to raise and lower said blade assembly relative to a supporting tractor.

3. A tractor attachment assembly comprising an elongated blade, a first strut pivotally connected at one end to said blade at one end of the latter, an axle engaging bracket pivotally secured to the other end of said first strut, a second strut connected at one end to said first strut intermediate the length of the latter and diverging from said first strut in a direction away from said blade, an axle engaging bracket pivotally secured to the other end of said second strut, a brace pivotally connected at one end to said blade at the other end of the blade and crossing said second strut, an axle engaging bracket pivotally connected to the other end of said brace, means connected between said brace and said second strut at the location at which said brace crosses said second strut for moving said brace toward and away from said second strut, and tractor carried means connected to said one end of the blade for raising and lowering said blade relative to a supporting tractor.

ANDY R. LAY.

REFERENCES CITED

The following references are of record in the file of this patent:

UNITED STATES PATENTS

| Number | Name | Date |
|---|---|---|
| 1,502,081 | Wilson et al. | July 22, 1924 |
| 2,229,210 | Kerber | Jan. 21, 1941 |
| 2,234,645 | Hetzelt | Mar. 11, 1941 |
| 2,337,104 | Hermsmeyer | Dec. 21, 1943 |